United States Patent [19]

Simms

[11] Patent Number: 5,040,885

[45] Date of Patent: Aug. 20, 1991

[54] TELESCOPE DESIGNATOR

[75] Inventor: Robert A. Simms, Phoenix, Ariz.

[73] Assignee: Murasa International, Long Beach, Calif.

[21] Appl. No.: 208,456

[22] Filed: Jun. 20, 1988

[51] Int. Cl.$^5$ .......................... G02B 23/00; F41G 1/32
[52] U.S. Cl. ...................... 350/537; 33/241; 359/800
[58] Field of Search ........................ 350/537, 236, 237; 33/241

[56] References Cited

U.S. PATENT DOCUMENTS 3,867,764   2/1975   Duhmire et al. ...................... 33/241

FOREIGN PATENT DOCUMENTS 2602037   1/1988   France .
0152427  11/1981   German Democratic Rep. ...................... 350/537

Primary Examiner—Bruce Y. Arnold
Assistant Examiner—James Phan
Attorney, Agent, or Firm—LaValle D. Ptak

[57] ABSTRACT

The telescope sight of a weapon may be utilized to provide both day and night spotting of a target aligned with the optical axis of the telescope by means of a point source or collimated source of visible or infrared light mounted in a housing on the eyepiece end of the telescope. The light is located on the optical axis of the telescope. When the telescope is mounted on a rifle or other weapon and the projected beam from the light source is aligned with the weapon trajectory, the spot of light designated by the beam indicates the target of interest.

13 Claims, 1 Drawing Sheet

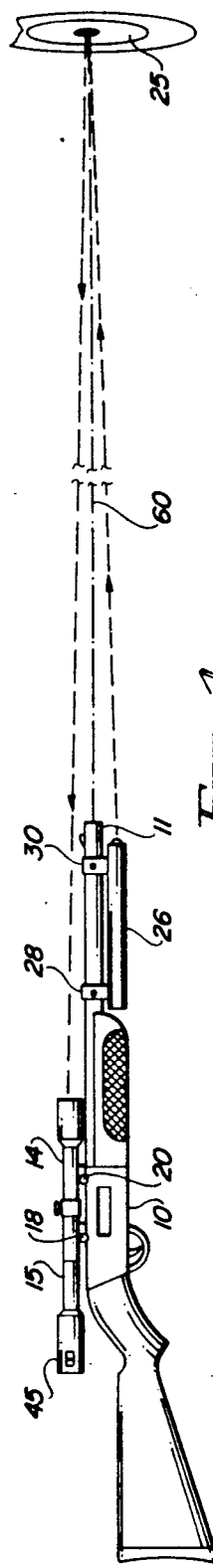
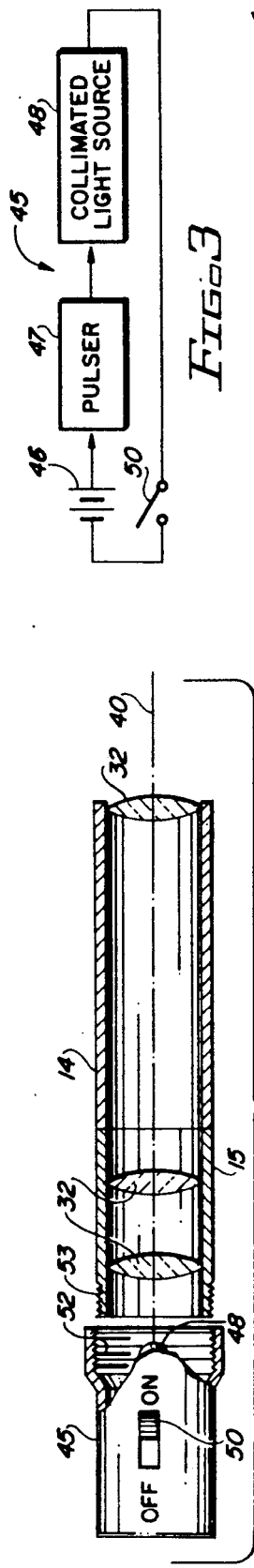
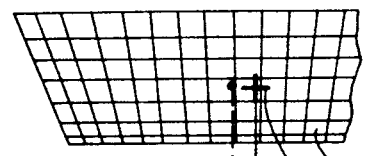
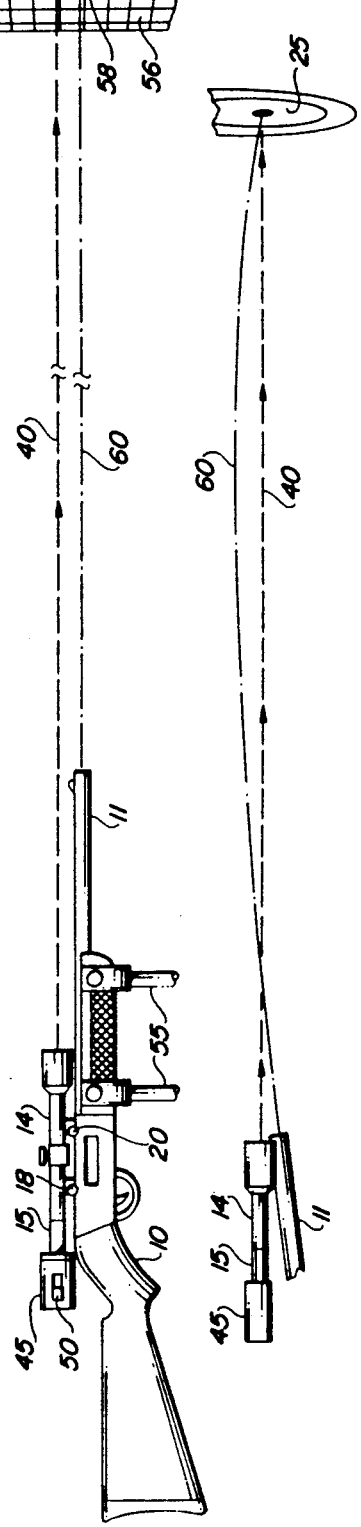

TELESCOPE DESIGNATOR

BACKGROUND

Optical telescopes are used in a variety of different applications. These applications primarily are for daytime use under natural lighting conditions and permit the user to discern greatly magnified, but narrow field of view, images as a result of use of the telescope. Typically such telescopes have an eyepiece located near the eye of the user, and the optics of the telescope are selected to cause the focal plane and the optical axis of the telescope to intersect at the location of the eye of the user. Focusing adjustments are provided to individualize this location for most telescopes.

A special application of telescopes is in the form of telescope sights for rifles or other weapons. Such telescope sights typically are mounted on top of the barrel of the rifle or other weapon to permit accurate sighting of the rifle for distant targets. Usually such a telescope sight includes a superimposed fine cross hair which intersects on the optical axis of the telescope for designating the location of the target. Since the optical axis essentially is straight, a telescope sight includes an adjustment which may be made to compensate for the trajectory characteristics of the bullet from the rifle at the particular range or distance at which the target appears. When this adjustment is made, the cross hairs in the telescope theoretically coincide with the termination point of the bullet at the target. For most daytime use, this is sufficient for relatively accurate use of the weapon by a hunter or target shooter once the use of the telescope on the rifle has been mastered.

A significant shortcoming of optical telescope sights, however, exists for use of a rifle equipped with such a telescope sight in poor lighting conditions or at night. The light gathering capabilities of telescopes are limited; and, as a consequence, optical telescopes are practically worthless for any nightime use. To compensate for this disadvantage, point source laser light transmitters have been developed for attachment to a rifle or other weapon in addition to the optical telescope. The laser emits a narrow beam or pencil of light. When this additional laser light source is calibrated to the trajectory of the weapon, it impinges upon or identifies the target of interest.

For use at night, a laser light source operating in the infrared region may be employed. The user of a rifle or other weapon provided with such equipment than must wear some type of night vision image enhancement equipment, such as conventional night vision goggles. With this equipment, the user may utilize the laser light source and the telescope to observe the target. This equipment is highly effective, but the additional laser light source in a separate housing typically is very expensive, because of the additional optics required in conjunction with the laser light source. In addition, the alignment of the weapon now requires three separate systems to be aligned, namely, the optical telescope, the laser source, and the trajectory of the bullet. This in turn, makes the use of the weapon more difficult also.

It is desirable to provide a system which is less expensive than the prior art systems described above, which readily converts any telescope equipped rifle or weapon into a system capable of use at night or day, and which is easy to use and requires minimum training on the part of the operator for accurate utilization.

SUMMARY OF THE INVENTION

Accordingly, it is an object of this invention to provide an improved telescope system.

It is another object of this invention to provide an improved system for facilitating the use of a telescope sight equipped rifle.

It is an additional object of this invention to provide an improved system for facilitating the use of a telescope sight equipped rifle under conditions of normal, little, or no light.

It is a still further object of this invention to convert a telescope into a light spot projection device through attachment of a point light source device to the telescope eyepiece.

In accordance with a preferred embodiment of this invention, a system for converting a telescope into a light spot projection device includes a source of light connected to a power source in a housing. The housing is mounted on the eyepiece end of the telescope to place the source of light on the intersection of the optical axis and the focal plane of the telescope to project light from the source along such optical axis through the telescope to a distant target.

BRIEF DESCRIPTION OF THE DRAWINGS

FIG. 1 is an illustration of a prior art telescope equipped rifle;

FIG. 2 is a partial cross-section of a portion of the device shown in FIG. 1, incorporating a preferred embodiment of the invention;

FIG. 3 is a circuit diagram of a circuit used in conjunction with the embodiment of FIG. 2;

FIG. 4 illustrates a rifle of the type shown in FIG. 1 equipped with the embodiment of FIG. 2 and used with apparatus for adjusting the range of the rifle; and FIG. 5 is diagramatic representation of the manner in which the embodiment of FIGS. 2, 3 and 4 is used.

DETAILED DESCRIPTION

Reference now should be made to the drawing in which the same reference numbers are used throughout the different figures to designate the same components. To facilitate an understanding of the invention and its manner of use, reference first should be made of FIG. 1 which illustrates a prior art telescope equipped rifle which includes further equipment to permit it to be used at night. As shown in FIG. 1, a standard rifle 10, which may be of any conventional configuration, has a barrel 11. The rifle 10 is operated in a conventional manner to shoot bullets which travel on a line or trajectory 60 toward a target 25. The rifle 10 is illustrated as equipped with a telescope sight 14, having an eyepiece 15 attached to its rear end and mounted on the rifle 10 through a pair of adjustment mountings 18 and 20.

The mountings 18 and 20 permit the optical axis of the telescope 14 to be adjusted relative to the central axis of the barrel 11. This is done to compensate for the trajectory of bullets emitted from the barrel of the rifle 11. Typically, adjustments of this type are made with a telescope sight by first sighting through the telescope 14 and then firing the rifle at a target 25 located the desired distance from the rifle. The angle of the telescope 14 relative to the barrel 11 then is adjusted as needed until the cross hairs of the telescope 14 intersect the target 25 at the same point where bullets fired from the rifle 11 also intersect the target.

Since bullets from a rifle or other weapon move along a trajectory or path which is not straight, but which falls or deviates from the axis of the barrel at an increasing rate proportional to the distance of the bullet from the rifle, it is necessary to make such an adjustment.

FIG. 5 illustrates, in exaggerated form, the final result of such an adjustment. This is illustrated by the dashed line 40 intersecting the center or bullseye of the target 25 in FIG. 5 along a straight line through the optical axis of the telescope 14. The barrel 11 of the rifle is adjusted to shoot bullets slightly upwardly with respect to the optical axis of the telescope 14 along the trajectory 60. For any selected distance, the adjustment of telescope 14 is chosen to cause the curved trajectory of bullets along the path 60 and the straight line optical axis projection 40 of the telescope 14 to intersect at the desired point on the target 25.

When a weapon or rifle of the type shown in FIG. 1 is to be used at night, it currently is common practice to attach an infrared laser 26 to the barrel 11 through a pair of attachment points 28 and 30 and to separately align the optical path of the collimated light transmitted by the laser 26 with the ballistic axis of the rifle 10. The user of the rifle 10 then wears or uses appropriate imaging detectors, such as night vision goggles, to observe targets by observing the light impinging on the target from the infrared laser 26. When a separate laser 26 is used in the manner shown in FIG. 1, however, the sighting in or adjustment of the weapon 10 becomes considerably more complex than it is for a rifle equipped only with a telescope sight 14, since it is necessary to properly align or adjust the optical axes of the the light source 26 with the central ballistic axis of the barrel 11 of the weapon. Once the rifle 10, is properly adjusted, however, it effectively may be used in the manner indicated above.

As illustrated in FIG. 2, the separate laser 26 attached to the barrel of the rifle may be eliminated by a light source housing 45 which includes a point light source or collimated light source 48 aligned with the optical axis 40 of the telescope 14. As illustrated in FIG. 2, the housing 45 is attached onto the lefthand or eyepiece end of the telescope 14, by means of the mating threads 52 and 53 on the housing 45 and the eyepiece end of the telescope 14, respectively.

An electrical circuit for energizing the light source 48 is provided in the housing 45 and is turned on and off by means of a suitable switch 50. The circuit for energizing the light source typically includes a battery 46 and a pulsing circuit 45 to supply current through the switch 50 to the light source 48. A steady state or "constantly on" light also could be used, but it has been found that significant conservation of energy from the battery 46 is effected by pulsing the light at a relatively high rate (on the order of 40 pulses per second). When this rate of pulses is used, the human eye integrates the light and it appears to be a steady, constantly on, source of light.

Since the light is projected directly on the optical axis of the telescope 14 through the internal lenses 32, it does not undergo any distortion, but is projected as a small circular beam of practical or minimal divergence in the direction the telescope 14 is pointed. The spot of light can be projected in any desired size to a distance well beyond the range of most hand-held weapons. The light source may be either an infrared or visible light emitting diode (LED), or an infrared or visible laser.

When a rifle 10 equipped with a light source 45 on the end of the telescope 14 is used, the telescope 14 no longer is employed as an optical interface directly with the eye of the user. If the user of the rifle or weapon equipped as shown in FIGS. 2 and 4, is wearing or using appropriate night imaging detectors, the user is able to covertly find and observe his target by means of the spot of infrared light projected through the telescope onto the target. Also, if the spot of projected light is visible, the user of the rifle or weapon 10 using night vision imaging detection equipment will find and observe his target at night also, though not covertly. The same target may be designated in the same manner in daytime using the same visible light system, except that it no longer is necessary to use night vision, light enhancement equipment or imaging detectors.

Once the initial adjustment of the projected beam is effected to align the beam with the weapon trajectory, the beam designates the target of interest; and the target can be hit simply by firing the weapon when the spot of light, from the beam, is on the target. The user no longer sights through the rifle telescope, but simply points the rifle at the target; and when the beam converges with the target, the rifle 10 is properly aimed. This is a significant departure from the standard use of a telescope sight as shown in conjunction with the prior art version of FIG. 1.

FIG. 4 illustrates the manner in which the sighting in or alignment of a rifle 10 may be effected, utilizing a telescope sight 14 equipped with a collimated light source 48 of the type shown in FIG. 2. The rifle 10 is mounted on a support stand 55, which is located a known precise distance from a calibrated target 56. The target 56 typically is divided horizontally and vertically to form a grid network. A designated cross-point 58 is precisely aligned with the central axis 60 of the barrel 11. this is accomplished by means of the mounting jig through the supports 55 and the location of the grid 56. Consequently, once an initial adjustment of the jig, including the supports 55 has been made for a given type of weapon or rifle 10, all other similar rifles mounted in the support stand 55 in the same way, will always have the central axis of the barrel 11 aligned with the point 58 on the target.

The telescope 14 is adjusted by means of the adjustments 18 and 20 to cause its side-to-side adjustment to align the optical axis 40 on the same vertical line of the target 56 as the barrel axis. The horizontal lines on the target 56 then correspond to different distances, calibrated in accordance with the particular trajectory of the bullets to be fired from the rifle 11, so that when the spot of light projected through the telescope 14 from the light source 48 in the housing 45, impinges at a particular horizontal line, the rifle 10 is "sighted in" or aligned with targets at the selected distance. This can be done for any distance at which the rifle 10 may be used, from relatively close targets to targets which will be located several hundred meters from the end of the barrel 11 of the rifle 10.

The net effect of any adjustment for any given range is illustrated in FIG. 5, which shows the convergence of a bullet emitted from the end of the barrel 11 and fired along the trajectory 60 with the straight line projected light along the optical axis 40 of the telescope 14 at the bullseye or designated target 25.

The foregoing description of the preferred embodiment of the invention should be taken as illustrative and not as limiting. Various changes and modifications will occur to those skilled in the art without departing from the true scope of the invention. The manner of attachment of the housing 45 to the telescope 14 may be varied in accordance with different telescopes and is not limited to the threaded attachment shown. All that is necessary is that the attachment aligns the light source 48 with the optical axis of the telescope, and different types of telescopes may be used.

I claim:

1. A system for facilitating the accuracy of use of weapon, having a conventional optical telescope sight with an optical axis and with an eyepiece end normally used to interface directly with the eye of a user, said system including in combination:
   a source of collimated light;
   a power supply connected to said source of light for energizing said source of light;
   a housing for said source of light and said power supply; and
   means for mounting said housing on the eyepiece end of said telescope sight to place said source of light on the optical axis of said telescope sight, replacing the normal optical interface with the eye of a user.

2. The combination according to claim 1 wherein said source of light is a source of infrared light.

3. The combination according to claim further including on/off switch means mounted in said housing and interconnected between said power supply and said source of light.

4. The combination according to claim 3, further including pulse circuit means connected in series circuit with said power supply and said source of light for turing said light on and off at a predetermined frequency.

5. The combination according to claim 1 wherein said source of light emits visible light.

6. The combination according to claim 5 further including on/off switch means mounted in said housing and interconnected between said power supply and said source of light.

7. The combination according to claim 6 further including pulse circuit means connected in series circuit with said power supply and said source of light for turning said light on and off at a predetermined frequency.

8. The combination according to claim 1 wherein said source of light is a laser light.

9. The combination according to claim 1 wherein said source of light is a Light Emitting Diode (LED).

10. The combination according to claim 9 wherein said source of light is a source of infrared light.

11. A method for converting an optical telescope from a light receiving device to a light projection device and where such telescope has an eyepiece end normally used to interface directly with the eye of a user, comprising the steps of:
    providing a collimated source of light;
    providing a power supply connected to said source of light for energizing said source of light;
    providing a housing for said source of light and said power supply; and
    mounting said housing on the eyepiece end of said telescope to place said source of light on the optical axis of said telescope, replacing the optical interface with the eye of a user.

12. The method according to claim 11 wherein said source of light is a Light Emitting Diode (LED).

13. The method according to claim 11 wherein said source of light is a laser light.

* * * * *